United States Patent
Paul

(10) Patent No.: US 11,685,307 B2
(45) Date of Patent: Jun. 27, 2023

(54) TURN SIGNAL CONTROL SYSTEM AND METHODS

(71) Applicant: DSRJ Inc, Apex, NC (US)

(72) Inventor: Doug Paul, Apex, NC (US)

(73) Assignee: DSRJ Inc., Apex, NC (US)

( * ) Notice: Subject to any disclaimer, the term of this patent is extended or adjusted under 35 U.S.C. 154(b) by 216 days.

(21) Appl. No.: 17/186,170

(22) Filed: Feb. 26, 2021

(65) Prior Publication Data

US 2022/0274522 A1  Sep. 1, 2022

(51) Int. Cl.
*B60Q 1/34* (2006.01)
*B62D 1/04* (2006.01)
*B60Q 1/00* (2006.01)

(52) U.S. Cl.
CPC ........... *B60Q 1/346* (2013.01); *B60Q 1/0082* (2013.01); *B62D 1/046* (2013.01)

(58) Field of Classification Search
CPC ....... B60Q 1/346; B60Q 1/0082; B62D 1/046
USPC ....................................................... 340/465
See application file for complete search history.

(56) References Cited

U.S. PATENT DOCUMENTS

| | | | |
|---|---|---|---|
| 2,793,262 A | 5/1957 | Albert | |
| 3,308,428 A | 3/1967 | Grontkowski | |
| 5,486,809 A | 1/1996 | Wadlington, Jr. | |
| 6,876,300 B2 | 4/2005 | Ponziani | |
| 7,173,524 B2 | 2/2007 | Ponziani | |
| 7,408,455 B2 | 8/2008 | Ponziani | |
| 7,843,360 B2 | 11/2010 | Ponziani | |
| 10,011,216 B1* | 7/2018 | Rovik | G06V 20/588 |
| 10,406,980 B2 | 9/2019 | Schofield | |
| 2004/0100373 A1 | 5/2004 | Ponziani | |
| 2005/0248449 A1 | 11/2005 | Ponziani | |
| 2007/0120661 A1 | 5/2007 | Ponziani | |
| 2009/0207012 A1 | 8/2009 | Ponziani | |
| 2012/0078123 A1* | 3/2012 | Futatsuyama | A61B 5/02125 600/521 |
| 2014/0309855 A1 | 10/2014 | Tran | |
| 2016/0001698 A1* | 1/2016 | Hall | B60Q 9/00 340/475 |

(Continued)

FOREIGN PATENT DOCUMENTS

| | | |
|---|---|---|
| CN | 107128243 A | 9/2017 |
| WO | 1998026952 A1 | 6/1998 |

OTHER PUBLICATIONS

Search Report and Written Opinion dated Apr. 11, 2022 for PCT/US22/12122 filed Jan. 12, 2022; pp. 14.

*Primary Examiner* — Kerri L McNally
(74) *Attorney, Agent, or Firm* — Hoffman Warnick LLC

(57) ABSTRACT

An aspect of the disclosure sets forth a turn signal system for a steering wheel that is easier to use and improves turn signal usage compliance and, accordingly, safety. The turn signal system includes at least one hand location detection sensor; at least one pressure actuated switch mechanism which is actuatable by the operator; a turn signal control, the turn signal control operatively connected to the at least one hand location detection sensor and the at least one pressure actuated switch mechanism, the turn signal control also operatively connected to left and right turn signals of the vehicle to indicate a turn to the left or right. Wherein actuation of the at least one pressure actuated switch mechanism by a hand of the operator of the vehicle provides a signal to the turn signal control to indicate a turn to the left or right.

18 Claims, 9 Drawing Sheets

(56) References Cited

U.S. PATENT DOCUMENTS

2016/0375910 A1   12/2016  McMillen et al.
2017/0334477 A1*  11/2017  Bossier ................ G01D 5/2417
2018/0244195 A1    8/2018  Haight
2020/0172122 A1    6/2020  Mimura et al.

* cited by examiner

US 11,685,307 B2

TURN SIGNAL CONTROL SYSTEM AND METHODS

TECHNICAL FIELD

The disclosure relates generally to improved vehicular turn signal controls for ease of use and improved safety. More particularly, the disclosure relates generally to turn signal controls disposed on a steering wheel.

BACKGROUND

Driving is complex act which requires continuous vigilance to ensure proper vehicle operations and to maximize safety. Lack of vigilance will occasionally have a driver choosing to execute a turn or lane change without signaling. Since the purpose of turn or lane change signal is to alert nearby drivers as to the drivers immediate intentions it logically follows that not using the signal clearly increases the likelihood of a collision with another vehicle. The probability that a driver executes an un-signaled turn or lane change increases as distractions inside the vehicle increase and/or if one of the driver's hands is involved in a non-steering activity (i.e. holding a mobile phone, cup or other item) as it adds a step to the process (i.e. set something down, switch hands on the wheel, attempt to use an elbow or knee to hold the wheel while reaching across, etc).

A Society of Automotive Engineers' paper (Richard Ponziani https://www.sae.org/publications/technical-papers/content/2012-01-0261) states that turn signals are not used ~25% of the time for turns, and ~48% of time for lane changes on highways in medium traffic. The study also discusses that 60% of rear end crashes could be avoided by 0.5 sec additional notice, and 90% if 1 sec of additional notice is provided to the trailing driver. The study is based on noticing an illuminated brake light, so turn signals would have similar benefits in avoiding collisions. This analysis was done in 2012 and it is easy to imagine that mobile phone usage and overall distractions have increased since.

BRIEF DESCRIPTION

A first aspect of the disclosure provides a turn signal system for a steering wheel. The turn signal system includes at least one hand location detection sensor on at least one side of the steering wheel; at least one pressure actuated switch mechanism also integral with the steering wheel, the at least one pressure actuated switch mechanism actuatable by the operator; a turn signal control, the turn signal control operatively connected to the at least one hand location detection sensor and the at least one pressure actuated switch mechanism, the turn signal control also operatively connected to left and right turn signals of the vehicle to indicate a turn to the left or right. The actuation of the at least one pressure actuated switch mechanism by a hand of the operator of the vehicle provides a signal to the turn signal control to indicate a turn to the left or right.

A second aspect of the disclosure provides a method of controlling a turn signal system. As embodied by the disclosure, the method includes grasping a steering wheel; monitoring a location and a number of hands grasping the steering wheel; determining locations of at least one of right hand and left hand on the steering wheel; determining if pressure is applied to the steering wheel to indicate a turn; determining if the pressure applied indicates a left turn or a right turn depending the pressure location with respect to the location of the right hand or left hand; and actuating a right turn signal or a left turn signal dependent on the pressure indicating a left turn or a right turn.

Another aspect of the disclosure includes a non-transitory computer readable storage medium storing code representative of control of a turn signal system by a turn signal control. The code enables the turn signal control to determine whether operator is grasping a steering wheel; monitors a location and a number of hands grasping the steering wheel; determines locations of at least one of right hand and left hand on the steering wheel; determines whether pressure is applied to the steering wheel to indicate a turn; determines whether the pressure applied indicates a left turn or a right turn depending the pressure location with respect to the location of the right hand or left hand; and actuates a right turn signal or a left turn signal dependent on the pressure indicating a left turn or a right turn.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
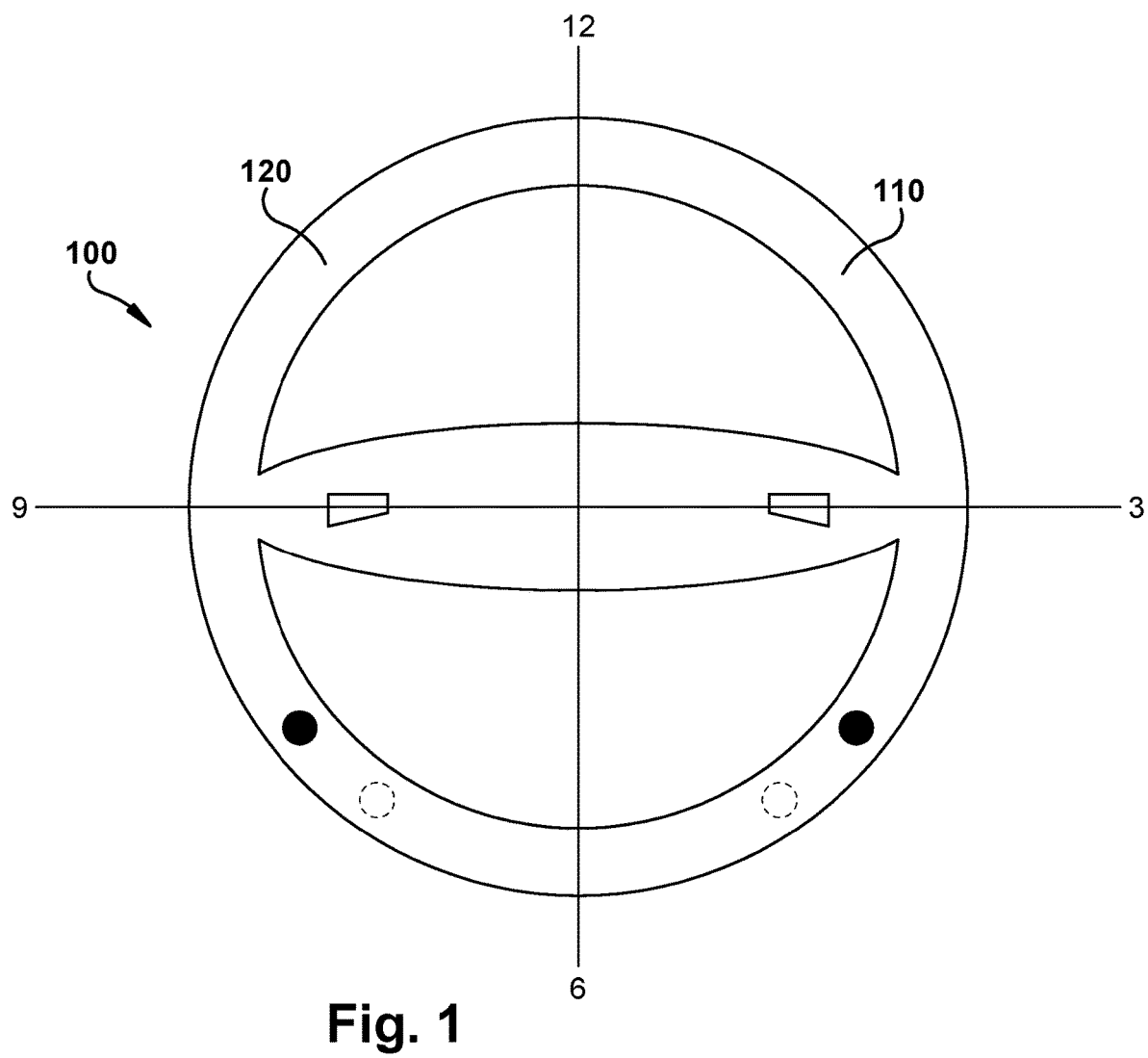
FIG. 1 illustrates a steering wheel with turn signal system according to embodiments of the disclosure.
Figure 2:
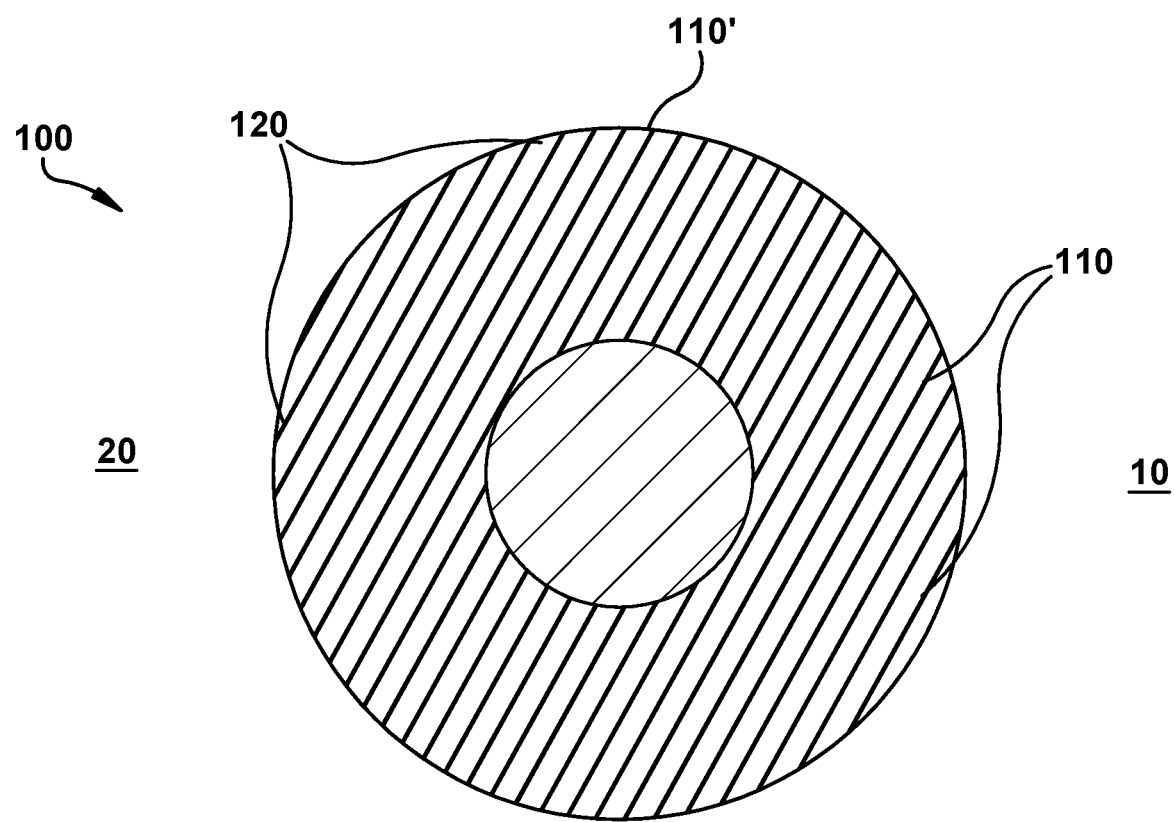
FIG. 2 illustrates a cross section of a steering wheel with turn signal system according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant components within vehicle and automotive devices, especially turn signals and steering wheels. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components.

Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "up" and "down" are terms that indicate a direction relative to general gravity. In general, down is defined as that direction which an object moves in reference to the Earth when the object is allowed to fall freely. Thus, up is then defined as the opposite direction of down. The terms "forward" and "aft," without any further specificity, refer to directions, with "forward" referring to the front, and "aft" (or "rear") referring to the rearward directions of the vehicle.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

An aspect of the disclosure, as illustrated in the Figures, and with reference to FIGS. 1-5, a steering wheel 100 includes a turn signal system 50 and method 400 to detect hand location on the steering wheel 100 while driving. In certain aspects, a steering wheel 100 is provided with at least one sensor 110 in the steering wheel 100 to detect hand location on the steering wheel 100. As embodied by the disclosure, the at least one hand location detection sensor 110 on the steering wheel 100 can include at least one of a pressure, temperature, optical, combinations thereof, or other sensor types, now known or hereinafter developed, to detect a hand location on the steering wheel 100.

As embodied by the disclosure, the term "lane change" means a moving vehicle on a multi-lane road switches lanes on a road. For example, a moving vehicle may move one lane to the right or one lane to the left, preferably upon signaling. Also, a vehicle may make a "turn" from one road to another. For example, the vehicle may turn left or right at an intersection where a road crosses or meets the road that the vehicle is driving. These are just the two most common, and legally defined, conditions, situations for usage of turn signals. It is not meant to be all inclusive. Other situations exist where turn signal usage is desirous, would improve safety, even where potentially not required, for example but not limited to, pulling away from a curb, parking including parallel or otherwise, merging onto road or highway, where a road splits, or in a parking lot.

In the figures of the disclosure, the steering wheel 100 is illustrated as substantially circular. However, this illustrated configuration is merely example of steering wheel 100 configurations within the scope of the embodiments. The steering wheel 100, as embodied by the disclosure, can be elliptical, oval, butterfly (for some F1 type cars), flat bottom or "D-shaped," or any other steering wheel shape now known or hereinafter developed. In yet another, aspect of the embodiments, turn control system 50 may be employed and incorporated onto handle bars of a motorcycle, scooter, moped, or similar device.

Hand location detection sensor 110 of the turn signal system 50 is located integral with the steering wheel 100 that the operator faces and engages. The disclosure uses the term "operator" that is often the driver of the car, the person behind the steering wheel. Depending on the vehicle and where it is built for the operator/driver (hereinafter "operator") of the vehicle is the person normally controlling steering, braking, acceleration and control over the vehicle. Moreover, in vehicles that include at least some capability of autonomous operation, the operator is the person seated behind the steering wheel, regardless of actual control of the vehicle.

Thus, as embodied by the disclosure, the hand location detection sensor 110 can be positioned on the steering wheel 100, for example but not limited to, positioned on any side or periphery of steering wheel 100, including on the front side 10 directly facing the operator. Moreover, in accordance with certain aspects of the disclosure, the hand location detection sensor 110 can also be positioned extending onto the top outer most periphery 110' of the steering wheel 100. Additionally, the hand location detection sensor 110 can also be positioned extending partially from the outer most periphery 110' of the steering wheel to the opposing side 20 of the steering wheel 110, further from the operator.

In yet a further aspect of the embodiments, the hand location detection sensor 110 can circumscribe the entire circumference of steering wheel 110. In other words, hand location detection sensor 110 extends 360° around steering wheel 110.

In certain aspects of the embodiment, the hand location detection sensor 110 of the turn signal system 50 can include a pressure sensor. Thus, when an operator of the vehicle puts their hand or hands H on the steering wheel 100, the pressure of one or both hands H of the operator indicates its location on the steering wheel 100.

In other aspects of the embodiment, the hand location detection sensor 110 of the turn signal system 50 can include a temperature sensor. In similar operation, when an operator of the vehicle puts their hand or hands H on the steering wheel 100, the temperature of one or both hands H of the operator on the steering wheel 110 of the turn signal system 50 indicates its location on the steering wheel 110.

In still further aspects of the embodiment, the hand location detection sensor 110 can include both a temperature sensor and a pressure sensor. Thus, when an operator of the vehicle puts their hand or hands H on the steering wheel 100, at least one of the pressure of one or both hands H of the operator and the temperature of one or both hands of the operator indicates its location on the steering wheel 100. Incorporation of both the hand location detection sensor 110 can include both a temperature sensor and a pressure sensor and provides detection of an operator's hand or hands H regardless of temperature differential. For example, and in no way limiting of the embodiments, in cold weather when an operator may have gloves on the hand, the pressure will indicate hand location. If an operator's grasp of the steering wheel 100 is light, the hand location of the operator may be detected by a temperature of the operator's hand on the steering wheel 100.

In yet a further aspect of the turn signal system 50, the hand location detection sensor 110 can include an optical sensor 112. An optical sensor 112 for the hand location detection sensor 110 can include embedded photo receptors in the steering wheel 100. In other aspects, the optical sensor 112 can be mounted in an interior of the vehicle to sense positioning of hands on steering wheel 100. For example and in no way limiting of the embodiments, the optical sensor 112 can be mounted in an interior of the vehicle on, above or below the dash; mounted to the roof of the vehicle, mounted to a rearview mirror, or mounted anywhere else in the vehicle. The embedded photo receptors are incorporated into the steering wheel 100 and will extend to a periphery of the steering wheel 100 so when a hand or hands H of an operator of the vehicle grasps the steering wheel 100, the embedded photo receptors may sense a change in ambient light that the embedded photo receptors received, thus indicating that and where a hand or hands H of the operator are located.

Aspects of the turn signal system 50, as embodied by the disclosure, also provide a pressure actuated switch mechanism 120. Pressure actuated switch mechanism 120 is probably positioned at least on the aft side of the steering wheel 100 but could be integral to the steering wheel 100 in any fashion. The pressure actuated switch mechanism 120 can be engaged by an operator's fingers F as they encircle the steering wheel 100. The pressure actuated switch mechanism 120 can be manipulated to indicate a turn signal 160, as described herein.

In accordance with a further aspect of the embodiments, pressure actuated switch mechanism 120 can be positioned at least on the rear side of the steering wheel 100 and extending to the front side of the steering wheel 100. Additionally, and as embodied by a still further aspect of the disclosure, pressure actuated switch mechanism 120 can be positioned at least on the rear side of the steering wheel 100 and can circumscribe the entire circumference of steering wheel 100. In other words, pressure actuated switch mechanism 120 can extend 360° around steering wheel 100.

In accordance with the embodiments, once the hand location detection sensor 110, in whatever configuration provided herein, recognizes the position of a hand or hands H of the operator, a finger or fingers F of the operator can then be used to provide pressure to the pressure actuated switch mechanism 120. The pressure to the pressure actuated switch mechanism 120 can include at least one of constant pressure to the pressure actuated switch mechanism 120 or pulsing pressure to the pressure actuated switch mechanism 120. This pressure on the pressure actuated switch mechanism 120 will communicate to a turn signal control 150 to actuate the appropriate turn signal 160, as described herein.

Moreover, turn signal control 150 can be set up in various ways in accordance with the vehicle operator. In one aspect of the embodiments, if one hand H is positioned on steering wheel 100, regardless of at "10" or "2" or even "6" o'clock, as embodied by the disclosure, the leftmost side of the hand can activate left signals while the right side activates right signals, regardless of if either the left or right hand of the operator. In a further aspect, if both hands H are on steering wheel 100, the left hand can operate left signals while the right hand operates right signals.

As embodied by the turn signal system 50, if the pressure actuated switch mechanism 120 on the rear 20 of the steering wheel 100 is actuated by a left most side of the operator's hand or hands H, such as by the left most finger or fingers F of the hand or hands H, then the turn signal control 150 (FIG. 5) will actuate the left turn blinker lights on the vehicle. Conversely, if the pressure actuated switch mechanism 120 on the rear of the steering wheel 100 is actuated by a right most side of the operator's hand or hands H, such as by the right most finger or fingers F, then the turn signal control 150 will actuate the right turn blinker lights on the vehicle.

As noted herein, the pressure that the operator's finger or fingers F of the hand or hands H applies to the pressure actuated switch mechanism 120 on of the steering wheel 100 will cause the turn signal control 150 to selectively activate the right or left blinker lights on the vehicle. The pressure that the operator's finger or fingers F of the hand or hands H applies to the pressure actuated switch mechanism 120 can be pulsing pressure, such a clinching or tapping of finger or fingers F of the hand or hands H. Alternately, the pressure that the operator's finger or fingers F of the hand or hands applies to the pressure actuated switch mechanism 120 can be a constant pressure. For example, pressure actuated switch mechanism 120, as embodied by the disclosure, can respond to at least one of a constant pressure and a pulsing pressure of finger or fingers F of the hand or hands H. In certain aspects of the embodiments, the pressure actuated switch mechanism 120, as embodied by the disclosure, can include a switching mechanism that can respond to pressure, such as but not limited to at least one of a constant pressure and a pulsing pressure of finger or fingers F of the hand or hands H.

Moreover, in accordance with another aspect of the embodiments, turn signal control 150 can enable the reverse of the above actions to disengage turn signal activation. For example, and in no way limiting of the embodiments, if a pulsing pressure is applied to activate a turn signal, then repeating the pulsing pressure will disengage the turn signal. Moreover, in accordance with another aspect, the turn signal control 150 may provide the vehicle operator with a feedback for confirmation that the turn signal has been disengaged. In some aspects of the embodiments, feedback may include a tactile feel at the operator's hand(s) H or other signal, such as audible or visual, that the turn signal has been disengaged. In a further aspect as embodied by the disclosure, the signal may include a haptic-like feel to the operator of the vehicle, including but not limited to a haptic feel at the hand(s) H.

Figure 5:
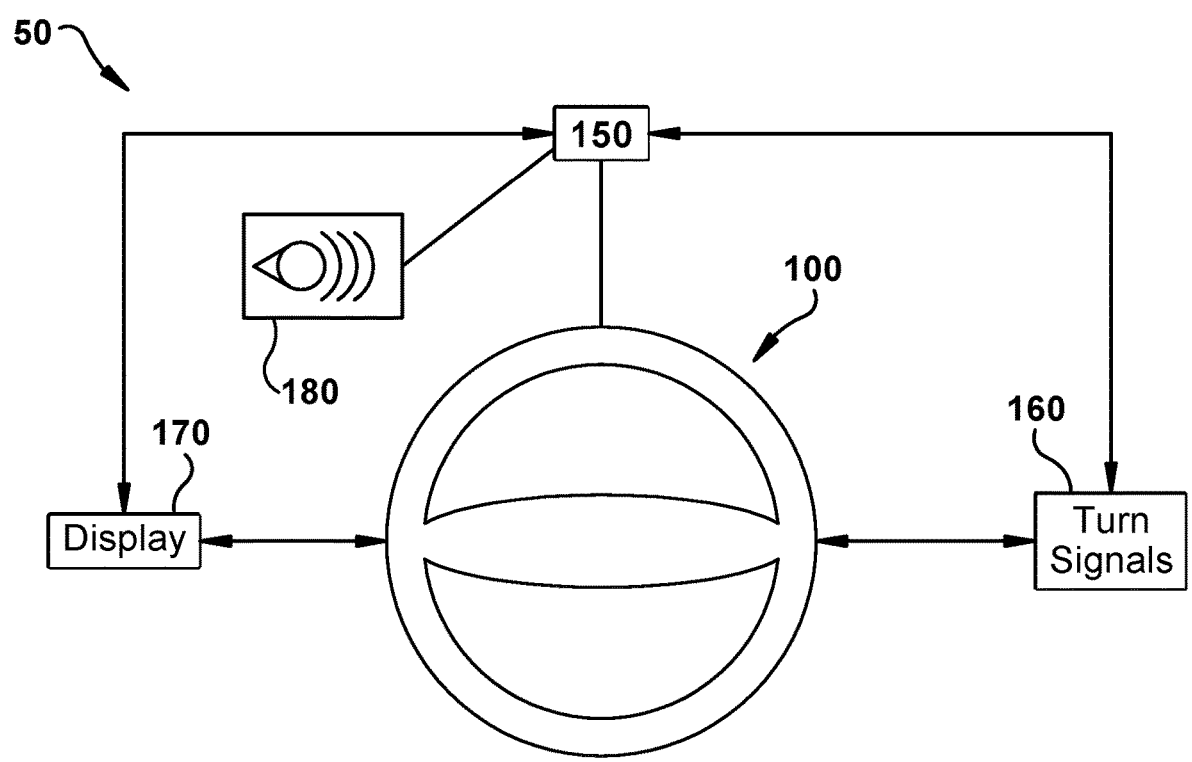
FIG. 5 is a schematic illustration of the turn signal system according to embodiments of the disclosure.

Moreover, in other aspects of the embodiments, the pressure actuated switch mechanism 120 that can respond to at least one of a constant pressure and a pulsing pressure communicates with a turn signal control 150. With reference to FIG. 5, the hand location detection sensor 110 and the pressure actuated switch mechanism 120 are operatively connected to a turn signal control 150. The turn signal control 150 can interpret the operator's actuation of the pressure actuated switch mechanism 120 by at least one of a constant pressure and a pulsing pressure of finger or fingers F of the hand or hands H, to determine if a left or right turn signal 160 is to be indicated, and when to stop left or right turn signal 160 indication, as noted herein.

In various aspects of the disclosure, as embodied herein, the pressure actuated switch mechanism 120 can include at least one switch mechanism that is actuatable by a finger or fingers F of an operator of the vehicle. For example, and in no way limiting of the embodiments, the at least one switch mechanism 120 can be a membrane switch, a tactile feedback membrane switch, a capacitance switch, switch assemblies that can integrate LEDs, tactile domed membrane switches, snap-dome membrane switches; and similar switches. The least one pressure actuated switch mechanism 120, as embodied by the disclosure, can be configured integral with the steering wheel 100. In other words, the least one switch mechanism 120 can extend from the vehicle's operator, but as noted above least one switch mechanism 120 can extend 360° around the steering wheel 100. Thus, the operator's finger or fingers F, in particular fingertip regions, as the operator holds the steering wheel 100, will be able to engage and actuate the pressure actuated switch mechanism 120.

Moreover, in certain aspects of the embodiment, the pressure actuated switch mechanism 120 can substantially encircle the entire steering wheel 100, as well extending 360° around the steering wheel 100. Therefore, as the hand or hands H and fingers F of the vehicle operator grasps the steering wheel 100, and pressure is applied, the finger or fingers F need not apply pressure to an exact position of the steering wheel 100, but where the operators hand H is positioned.

The turn signal control 150 will first sense the location of an operator's hand or hands H based on a signal or signals from the hand location detection sensor 110. Then turn signal control 150, as embodied by the disclosure, will identify where "left" and "right" would be for each hand on the steering wheel 100. Accordingly, if the identified left or right for each hand has pressure, such as constant or pulsing pressure, applied to the pressure actuated switch mechanism 120 at that hand location, the turn signal control 150 causes the appropriate, left or right, turn signal 160 to operate or blink to indicate a turn.

In accordance with one aspect of the embodiments, the turn signal 160 will be indicated as long as pressure is applied to the pressure actuated switch mechanism 120. In another aspect of the embodiments, the turn signal 160 will be indicated upon vehicle operator pressing the pressure actuated switch mechanism 120 once, and the pressure actuated switch mechanism 120 will cease being indicated when the operator of the vehicle presses pressure actuated switch mechanism 120 again. In another feature of the disclosure, pressure actuated switch mechanism 120 can be pressed once to indicate the turn signal 160, and to cease indication of the turn signal 160, pressure actuated switch mechanism 120 can be pressed twice, in a relatively rapid fashion, such as but not limited to a "mouse" double click. As embodied by the disclosure, turn signal control 150 can be set to provide any desirable operation for the vehicle turn signals, including once the turn signal is enabled with the left or right hand, disabling the turn signal may be achieved with either hand. An aspect if the embodiments enables turn signal control 150 to be set to the operation that vehicle operator(s) desire. Moreover, if a vehicle may have more than one operator, each operator may have different preferences. Thus, turn signal control 150, as embodied by the disclosure, may include a setting for each operator, similar to the ability to set different seat settings in a vehicle for different operators.

If the operator of the vehicle shifts their hand or hands while driving, the turn signal control 150 will sense and refresh the location of an operator's hand or hands based on a signal or signals from the hand location detection sensor 110. Accordingly, the turn signal control 150, as embodied by the disclosure, will re-identify where "left" and "right" would be for each hand on the steering wheel 100 based on the shifted position of the operator's hands. This sensing and refreshing the location of an operator's hands can be continuous during operation of the vehicle. Accordingly, the turn signal control 150, as embodied by the disclosure, can activate and deactivate the turn signal 160 without removing the operator's hand from the steering wheel 100.

As embodied by the disclosure, the hand location detection sensor 110 and pressure actuated switch mechanism 120 can extend around the periphery of steering wheel 100, as seen in FIG. 1. The hand location detection sensor 110 and pressure actuated switch mechanism 120 can extend 360° around the steering wheel 100. Alternately, and as desired, the hand location detection sensor 110 and pressure actuated switch mechanism 120 can extend any distance around the steering wheel 100. For example, and in no way limiting of the embodiments, the hand location detection sensor 110 and pressure actuated switch mechanism 120 can extend from approximately 1° to about 360° around the circumference of the steering wheel 100.

Figure 3:
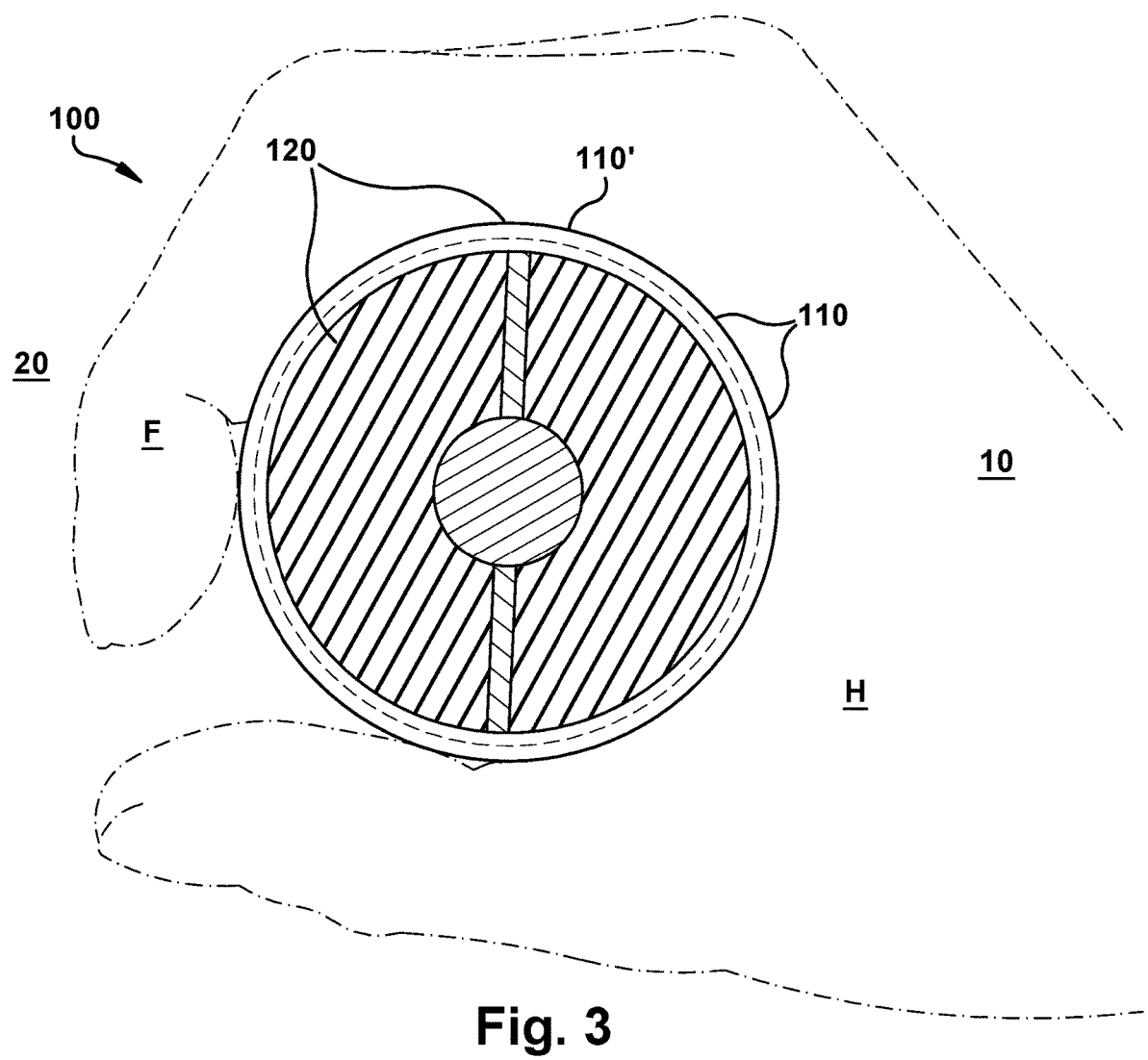
FIG. 3 illustrates a cross section of a steering wheel with turn signal system engaged by fingers of a vehicle operator according to embodiments of the disclosure.

Also, the location detection sensor 110 and pressure actuated switch mechanism 120 can extend 360° around the circumference of a section of the steering wheel 100 as illustrated in FIG. 3. The larger the extent of the location detection sensor 110 and pressure actuated switch mechanism 120 around the steering wheel 100, the more responsive the hand location detection sensor 110 and pressure actuated switch mechanism 120 can be to the operator's position.

Also, in accordance with further aspects of the embodiment, the turn signal control 150 can be connected to a display 180 to indicate status of the hand location detection sensor 110 and pressure actuated switch mechanism 120, operations of the overall turn signal system 50, the locations of an operator's hands on the steering wheel 100, indication and confirmation of operation of the hand location detection sensor 110 and pressure actuated switch mechanism 120, among other status indicators. Also, the turn signal control 150 can indicate on a display 180 a timer if a turn signal has been on for too long a period of time. That period of time can be preset or determined by the operator. Moreover, the turn signal control 150 can indicate on the display 180 an alert if a turn signal has been on for too long a period of time.

Additionally, the turn signal control 150 can audibly or visibly indicate an alert if a turn signal has been on for too long a period of time. In yet another aspect as embodied by the disclosure, the turn signal control 150 can indicate turn signal operation by a heads-up display on the windshield, similar to the information displayed to a pilot providing data without requiring vehicle operators to look away from their usual viewpoints, ahead of the car or at mirrors. In another aspect of the embodiments, turn signal control 150 provides an additional flasher (not illustrated for ease of understanding), which is larger and more distinct from conventional dashboard flashers, where the additional flasher that could be anywhere in vehicle so an operator has notice, for example, but not limited to, in at least one of a steering wheel, mirror, and a heads up display.

In a further aspect of the embodiment, the turn signal control 150 can provide an audio signal. The audio signal can indicate to the vehicle operator that that a turn signal 160 is blinking. Also, in addition to or as an alternative to the audio signal, the turn signal control 150 can operate a lamp, LED or similar visual indicator to display to the operator that a turn signal 160 is operating. The audio signal or the visual indicator can be provided anywhere in the vehicle that an operator of the vehicle can see and/or hear Another aspect of the turn signal system 50, as noted above, provides the pressure actuated switch mechanism 120 with a tactile feel to the operator's hand and/or finger(s) that the turn signal 160 is operating. Various membrane switches provide a tactile feel, for example a snap dome on a membrane switch. Moreover, the pressure actuated switch mechanism 120, as embodied by the disclosure, can be provided with a haptics or other technology that stimulates the sense of touch and motion, to reproduce in remote operation or computer simulation the sensations that would be felt by a vehicle operator interacting directly with pressure actuated switch mechanism 120 in the steering wheel 100.

Figure 4:
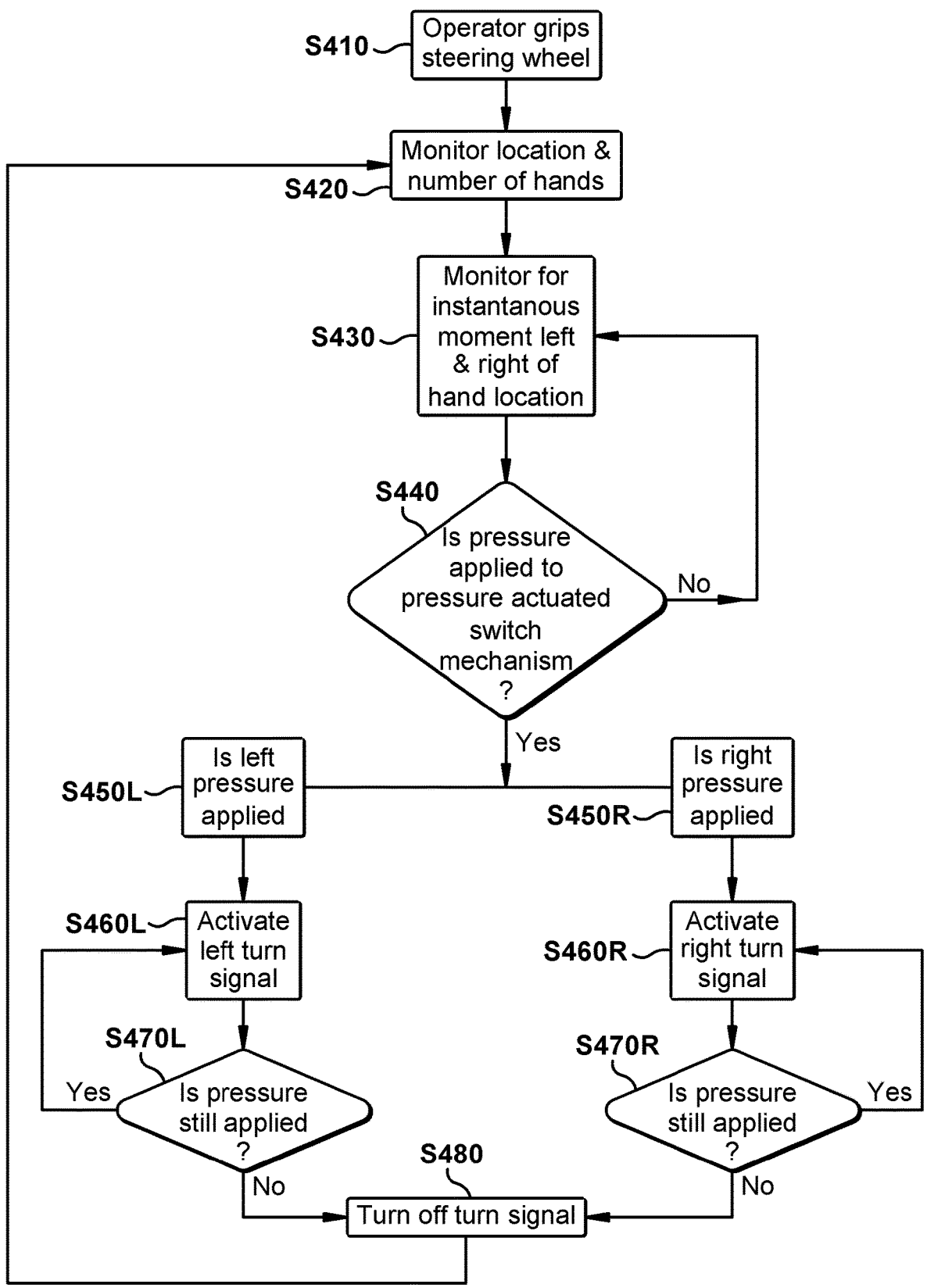
FIG. 4 is a flow chart illustrating turn signal control steps according to embodiments of the disclosure.

FIG. 4 illustrates a flow chart illustrating turn signal 160 control steps according to embodiments of the disclosure. The operational method 400 includes step S410 where a vehicle operator grasps the steering wheel. At step S420, the turn signal control 150 monitors the location and number of hands on the steering wheel. The monitoring can be continuous. At step S430, the turn signal control 150 monitors instantaneous locations of right and/or left hand H for each of the monitored operator's hands H on the steering wheel 110. Next at step S440, the turn signal control 150 determines if it detects pressure being applied to the pressure actuated switch mechanism 120. If there is no pressure applied, the method 400 continues to monitor the location and number of hands H on the steering wheel at step S420. If at step S440, pressure to the pressure actuated switch mechanism 120 is detected, the method 400 moves to determine if the pressure to the pressure actuated switch mechanism 120 is left pressure is applied or if the pressure to the pressure actuated switch mechanism 120 is right pressure applied to steering wheel 110, steps S450L and S450R respectively. If pressure to the pressure actuated switch mechanism 120 is detected, the appropriate turn signal 160 is activated at steps S460L and S460R, respectively. The activations of the appropriate turn signal 160 continues until pressure to the pressure actuated switch mechanism 120 is no longer detected at steps S470L and S470R, respectively. When pressure to the pressure actuated switch mechanism 120 is no longer detected at steps S470L and S470R, the method 400 proceeds to step S480 where the turn signal 160 is de-activated. After de-activating the respective turn signal 160 the method returns to step S420, to monitor location and number of hands.

FIG. 5 is a schematic of the turn signal system 50, as embodied by the disclosure. The turn signal system 50 includes the steering wheel 100 and its components, the turn control system 150, turn signals 160, display 170 and alarm 180. Signals from the pressure actuated switch mechanism 120 on the steering wheel 100 are provided to turn control system 150. Turn control system 150 is operably connected to turn signal 160, display 170, and alarm 180. The connection from turn control system 150 can be wired or wireless.

As discussed herein, the turn signal control 150 can provide a visual signal to display 170 or an audio signal to speaker of display 170 or alarm 180 to indicate that a turn signal 160 is operating/activated. Also, the turn signal control 150 can operate a lamp, LED or similar visual indicator in display 170 to the operator that a turn signal 160 is operating. As embodied by the disclosure, display 170 and alarm 180 can be part of the dashboard of the vehicle, part of the information center of the vehicle, a separate module provided with the vehicle, combinations thereof, or any other vehicle component that can provide indications of turn signal 160 operation.

FIGS. 6-9 illustrate various locations an operator's hands in a vehicle equipped with a steering wheel 100, as embodied by the disclosure, including the turn signal system 50. As visible, the hand or hands H grasp the steering wheel 100, the turn signal system 50 monitors and determines right R and left L positions of the hand or hands H on the steering wheel 100.

Figure 6:
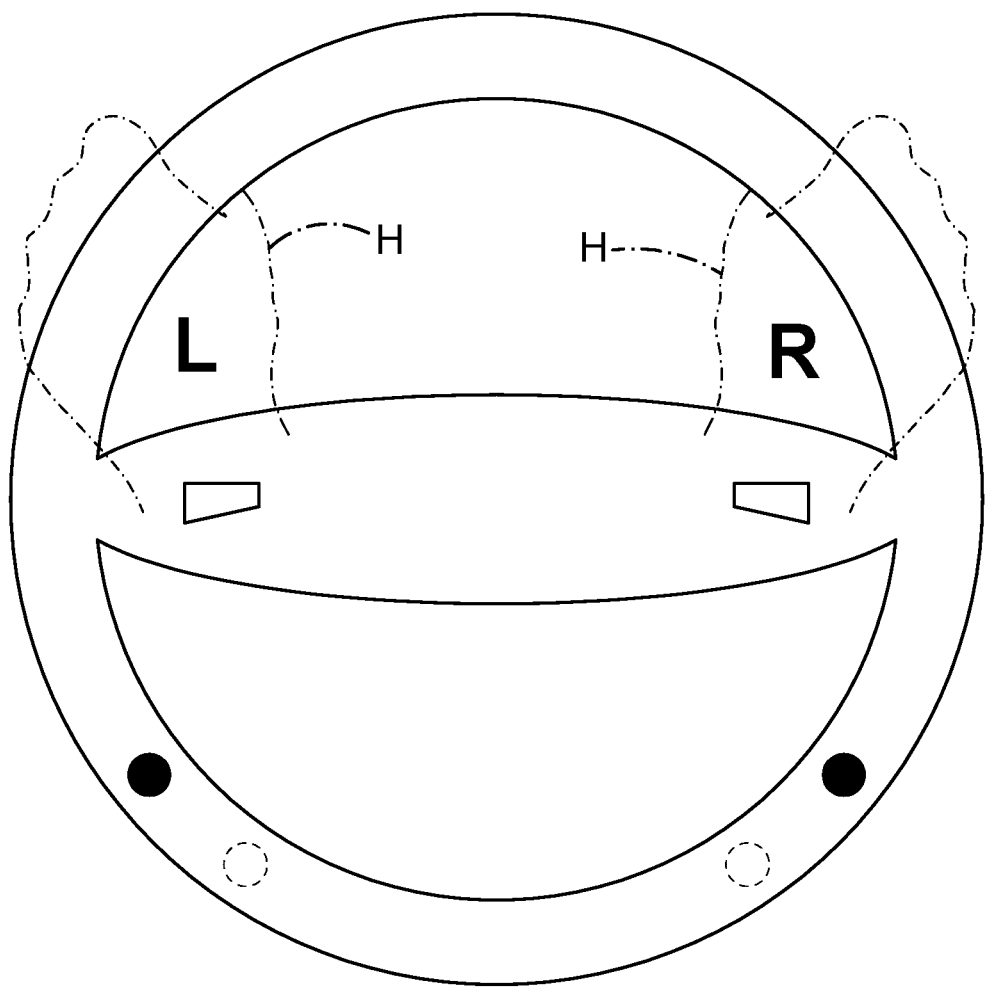
FIGS. 6-9 schematically illustrate a vehicle operator's hands on a steering wheel with left (L) and right (R) indicated according to embodiments of the disclosure.

With respect to FIG. 6, in an aspect of the operator having two hands on steering wheel, turn signal control 150 can be set to have the left hand indicate and operate left hand turn signal only and have the right hand indicate and operate right hand turn signal only. Thus, as embodied by the disclosure, if and when the operator provides finger F pressure to the pressure actuated switch mechanism 120 on the steering wheel 100, the turn signal system 50 immediately activates the corresponding turn signal 160 depending on the right or left side of the operator's hand H. Further, if the operator has two hands on steering wheel, turn signal control 150 can be set to recognize if a sensor, such as but not limited to the pressure actuated switch mechanism 120, indicates that the operator has removed one hand from steering wheel 100 and only one hand remains on steering wheel 100. At this point, the operation of the turn signal system 50 will operate in "one-hand" mode where the left hand side of the one hand will indicate and operate left hand turn signal only and have the right hand side of the one hand will indicate and operate right hand turn signal only.

Figure 7:
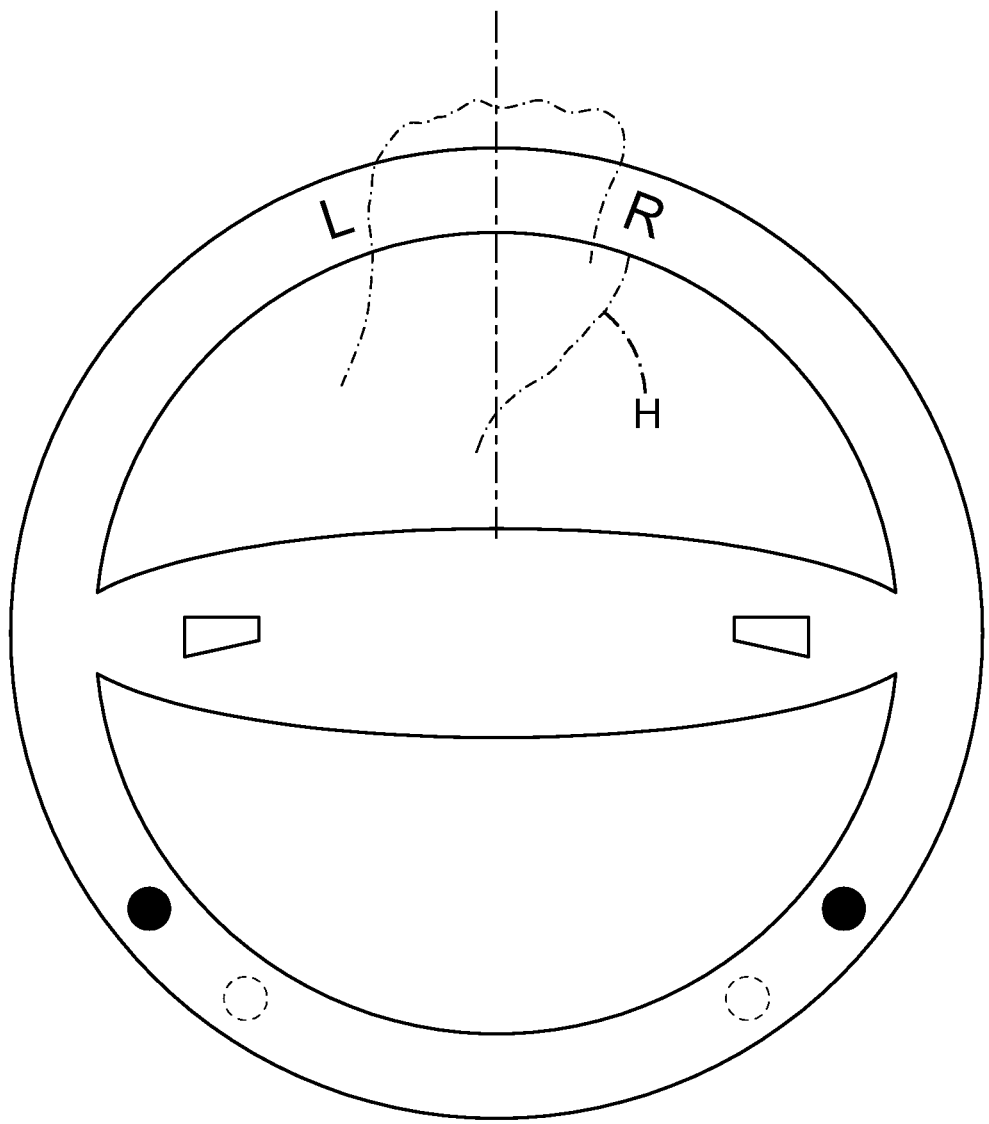
Figure 8:
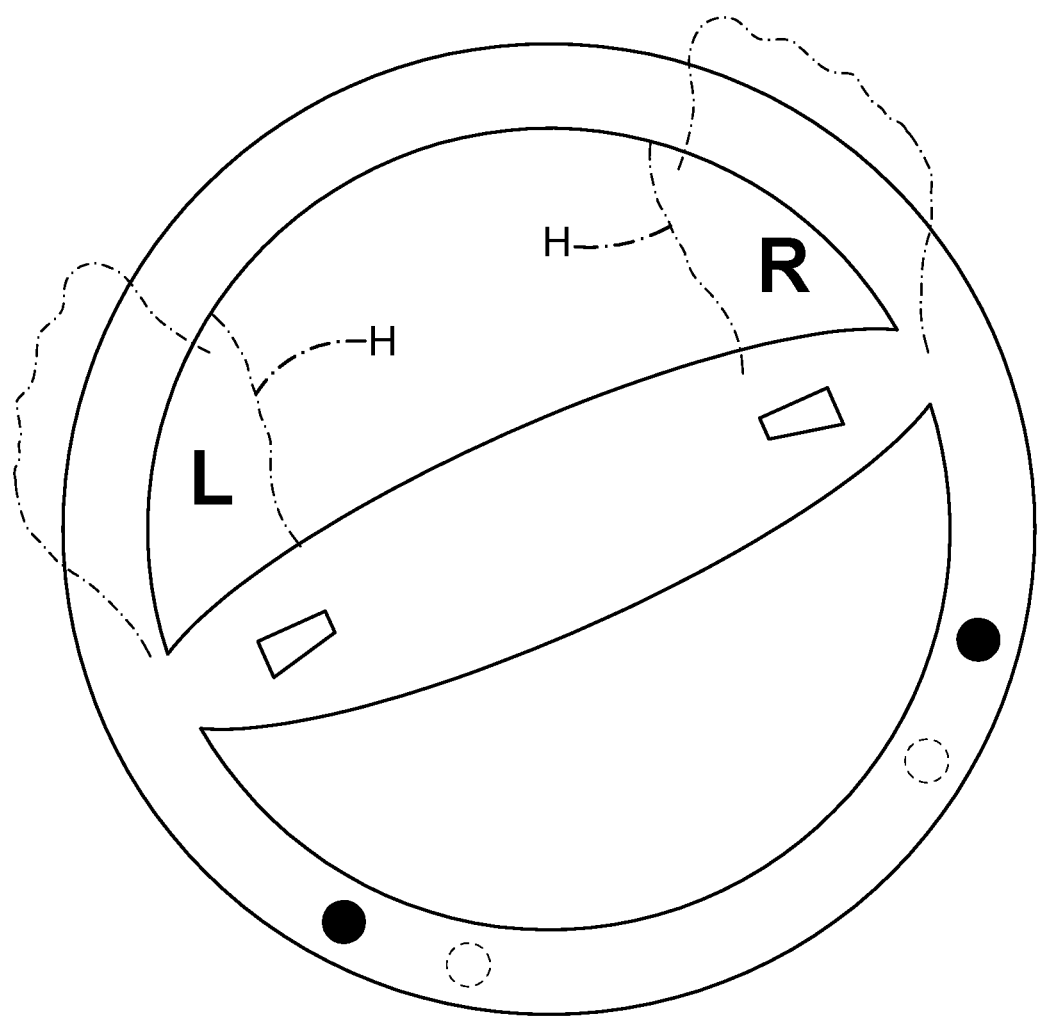
Figure 9:
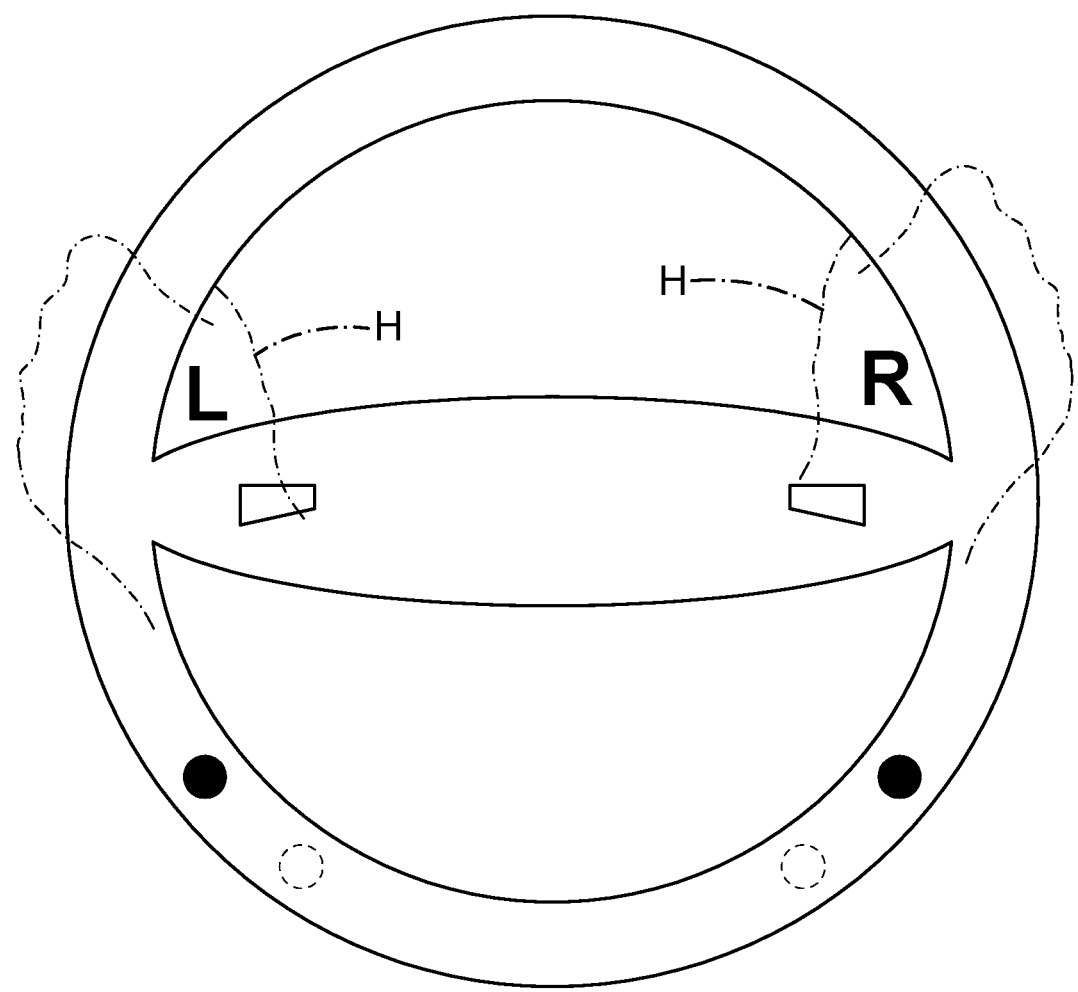

Moreover, in FIG. 7, one hand H is illustrated. The hand (H) in FIG. 7 can be either a right hand or left hand for purposes of illustration. As embodied by the disclosure, if one had is anywhere on steering wheel 100, the left (L) side of hand (H) will be used to initiate a left turn signal, and the right (R) side of hand (H) will be used to initiate a left turn signal.

As will be appreciated by one skilled in the art, turn signal control 150 can include computer program or product. Accordingly, the turn signal control 150 can may include hardware, may include software (including firmware, resident software, micro-code, etc.), or may include software and hardware, where all may generally be referred to herein as a "circuit," "module" or "system." Furthermore, the turn signal control 150 may include a computer program product embodied in any tangible medium of expression having computer-usable program code embodied in the medium.

Any combination of one or more computer usable or computer readable medium(s) may be utilized for the turn signal control 150. The computer-usable or computer-readable medium may be, for example but not limited to, embodied in the computer systems of the vehicle, or alternatively, as a separate module in the vehicle. The computer-usable or computer-readable medium for the turn signal control 150 may be, for example but not limited to, an electronic, magnetic, optical, electromagnetic, infrared, or semiconductor system, apparatus, device, or propagation medium. More specific examples (a non-exhaustive list) of the computer-readable medium of the turn signal control 150 would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

The turn signal control 150 is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Another aspect of the turn signal system 50 as embodied by the disclosure, a vehicle may have the turn signal lever eliminated, as the turn signal system 50 will function to indicate turns. Additionally, with the incorporation of the turn signal system 50, including turn signal control 150, as embodied by the disclosure the historic mechanical automatic shutoff of turn signals incorporated in the steering column can be eliminated. Also, turn signal control 150 provided customization and additional potential functionality into turn control system 50.

The turn signal control 150, as embodied by the disclosure, can be programmed in the turn signal control 150 by the manufacture or vehicle owner for preferences of turn signal system 50 options. Alternatively, turn signal control 150, as embodied by the disclosure, can include Artificial Intelligence capabilities, which would enable the turn signal system 50 and its turn signal control 150 to learn and adapt to situations and preferences by operator of the vehicle.

Moreover, turn signal control 150 of turn signal system 50, as embodied by the disclosure, may include multiple settings for different operators of the vehicle. Thus, family members can enter personal identification information into the turn signal control 150 of turn signal system 50, and have their preferences for turn signal control 150 of turn signal system 50 operation.

Other aspects of the embodiments with respect to turn signal control 150 of turn signal system 50 include, and in no way limiting of the embodiments, programming turn signal system 50 to have the turn signal 160 will be indicated as long as pressure is applied to the pressure actuated switch mechanism 120; or turn signal 160 indicated upon vehicle operator pressing the pressure actuated switch mechanism 120 once, and the pressure actuated switch mechanism 120 will cease being indicated when the operator of the vehicle presses pressure actuated switch mechanism 120 again; or where pressure actuated switch mechanism 120 can be pressed once to indicate the turn signal 160, and to cease indication of the turn signal 160, pressure actuated switch mechanism 120 can be pressed twice, in a relatively rapid fashion, such as but not limited to a "mouse" double click, as discussed above.

Further, the turn signal control 150 can be programmed so the turn signal control 150 can indicate turn signal operation by a heads-up display on the windshield, similar to the information displayed to a pilot providing data without requiring vehicle operators to look away from their usual viewpoints, ahead of the car or at mirrors.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A turn signal system for a steering wheel, the turn signal system comprising:
    at least one hand location detection sensor on at least on one side of the steering wheel facing an operator;
    at least one pressure actuated switch mechanism on at least an opposite side of the steering wheel from the at least one hand location detection sensor, the at least one pressure actuated switch mechanism actuatable by the operator; and
    a turn signal control, the turn signal control operatively connected to the at least one hand location detection sensor and the at least one pressure actuated switch mechanism, the turn signal control also operatively connected to left and right turn signals of the vehicle to indicate a turn to the left or right;
    wherein actuation of the at least one pressure actuated switch mechanism by a hand of the operator of the vehicle provides a signal to the turn signal control to indicate a turn to the left or right;
    wherein the turn signal control determines if the operator has one or two hands on the steering wheel and determines a left and right side on the steering wheel; and
    wherein the least one pressure actuated switch mechanism is configured to be actuatable by constant pressure applied by a left side or right side of the operator's hand to indicate a left turn or right turn of the vehicle, respectively.

2. A turn signal system according to claim 1, wherein the at least one hand location detection sensor includes a pressure activated at least one hand location detection sensor.

3. A turn signal system according to claim 1, wherein the at least one hand location detection sensor includes a temperature activated at least one hand location detection sensor.

4. A turn signal system according to claim 1, wherein the at least one hand location detection sensor includes an optical activated at least one hand location detection sensor.

5. A turn signal system according to claim 1, wherein the at least one hand location detection sensor includes at least one of a pressure activated at least one hand location detection sensor, a temperature activated at least one hand location detection sensor, and an optical activated at least one hand location detection sensor.

6. A turn signal system according to claim 1, wherein the least one pressure actuated switch mechanism provides at least one of tactile feel to the hand of the operator, audio indication, and visual indication of a left turn or right turn signal being actuated.

7. A turn signal system according to claim 1, wherein the least one hand location detection sensor is disposed over the entire periphery of the steering wheel.

8. A turn signal system according to claim 1, wherein the at least one pressure actuated switch mechanism is disposed over the entire periphery of the steering wheel.

9. A method of controlling a turn signal system, the method comprising:
    grasping a steering wheel;
    monitoring a location and a number of hands grasping the steering wheel;
    determining locations of at least one of right hand and left hand on the steering wheel;
    determining if pressure is applied to the steering wheel to indicate a turn;
    determining if the pressure applied indicates a left turn or a right turn depending the pressure location with respect to the location of the right hand or left hand;
    actuating a right turn signal or a left turn signal dependent on the pressure indicating a left turn or a right turn; and
    ceasing actuating of the right turn signal or the left turn signal when pressure indicating a left turn or a right turn is no longer applied to the steering wheel.

10. A method of controlling a turn signal system according to claim 9, wherein at least one hand location detection sensor is disposed on a side of the steering wheel facing the operator, the at least one hand location detection sensor sensing a location and number of hands grasping the steering wheel.

11. A method of controlling a turn signal system according to claim 9, wherein the at least one pressure actuated switch mechanism senses if pressure is applied to the steering wheel to indicate a turn.

12. A method of controlling a turn signal system according to claim 11, wherein the at least one pressure actuated switch mechanism further senses if the pressure applied indicates a left turn or right turn depending on pressure applied to the at least one pressure actuated switch mechanism by a right side of a hand or left side of a hand.

13. A method of controlling a turn signal system according to claim 11, further including continuing to monitor the location and number of hands on the steering wheel in an absence pressure applied to the at least one pressure actuated switch mechanism by a right side of a hand or left side of a hand.

14. A non-transitory computer readable storage medium storing code representative of control of a turn signal system by a turn signal control, the code enabling the turn signal control to:
    determine whether an operator is grasping a steering wheel; monitoring a location and a number of hands grasping the steering wheel;

determine locations of at least one of right hand and left hand on the steering wheel;

determine whether pressure is applied to the steering wheel to indicate a turn;

determine whether the pressure applied indicates a left turn or a right turn depending the pressure location with respect to the location of the right hand or left hand; and actuate a right turn signal or a left turn signal dependent on the pressure indicating a left turn or a right turn; and ceasing actuating of the right turn signal or the left turn signal when pressure indicating a left turn or a right turn is no longer applied to the steering wheel.

15. A non-transitory computer readable storage medium storing code according to claim 14, wherein at least one hand location detection sensor is disposed on a side of the steering wheel facing the operator, the at least one hand location detection sensor sensing a location and number of hands grasping the steering wheel.

16. A non-transitory computer readable storage medium storing code according to claim 14, wherein at least one pressure actuated switch mechanism is disposed an opposite side of the steering wheel from the at least one hand location detection sensor, the at least one pressure actuated switch mechanism sensing if pressure is applied to the steering wheel to indicate a turn.

17. A non-transitory computer readable storage medium storing code according to claim 14, wherein the at least one pressure actuated switch mechanism further senses if the pressure applied indicates a left turn or right turn depending on pressure applied to the at least one pressure actuated switch mechanism by a right side of a hand or left side of a hand.

18. A non-transitory computer readable storage medium storing code according to claim 14, continuing to monitor the location and number of hands on the steering wheel in an absence of pressure applied to the at least one pressure actuated switch mechanism by a right side of a hand or left side of a hand.

* * * * *